(12) United States Patent
Uto et al.

(10) Patent No.: US 10,570,805 B2
(45) Date of Patent: Feb. 25, 2020

(54) COOLING SYSTEM FOR VEHICLE

(71) Applicant: HONDA MOTOR CO., LTD., Tokyo (JP)

(72) Inventors: Hajime Uto, Wako (JP); Noritaka Kimura, Wako (JP); Yuto Katori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 185 days.

(21) Appl. No.: 15/825,103

(22) Filed: Nov. 29, 2017

(65) Prior Publication Data

US 2018/0163607 A1 Jun. 14, 2018

(30) Foreign Application Priority Data

Dec. 14, 2016 (JP) .................................. 2016-242720

(51) Int. Cl.
*F01P 7/14* (2006.01)
*B60H 1/00* (2006.01)
(Continued)

(52) U.S. Cl.
CPC ............ *F01P 7/14* (2013.01); *B60H 1/00278* (2013.01); *B60K 11/02* (2013.01); *B60K 11/04* (2013.01);
(Continued)

(58) Field of Classification Search
CPC .... F01P 7/14; F01P 7/165; F01P 7/164; F01P 3/12; F01P 3/20; F01P 2060/02;
(Continued)

(56) References Cited

U.S. PATENT DOCUMENTS 6,357,541 B1 * 3/2002 Matsuda .................. B60K 6/22
180/68.2
8,448,696 B2 * 5/2013 Johnston ............... B60L 3/0046
165/104.32
(Continued)

FOREIGN PATENT DOCUMENTS

JP 05-131848 5/1993
JP 2001-032713 2/2001
(Continued)

OTHER PUBLICATIONS

Japanese Office Action for corresponding JP Application No. 2016-242720, dated Jun. 26, 2018 (w/ English machine translation).
(Continued)

*Primary Examiner* — Grant Moubry
(74) *Attorney, Agent, or Firm* — Mori & Ward, LLP

(57) ABSTRACT

A cooling system for a vehicle, includes a first cooling circuit including a first coolant passage and a first pump. The first pump is provided in the first coolant passage to circulate coolant in the first cooling circuit so as to cool a first device to a first temperature. A second cooling circuit includes a second coolant passage and a second pump. The second pump is provided in the second coolant passage to circulate coolant in the second cooling circuit so as to cool a second device to a second temperature. The second temperature is lower than the first temperature. The coolant introduction passage connects the first cooling circuit and a connected portion of the second cooling circuit between the second device and a second radiator and upstream of the second device to supply the coolant in the first cooling circuit to the second cooling circuit.

16 Claims, 6 Drawing Sheets

(51) Int. Cl.

| | | |
|---|---|---|
| *F02B 29/04* | (2006.01) | |
| *H01M 10/625* | (2014.01) | |
| *B60K 11/02* | (2006.01) | |
| *F01P 3/12* | (2006.01) | |
| *B60K 11/04* | (2006.01) | |
| *F01P 7/16* | (2006.01) | |
| *H01M 10/663* | (2014.01) | |
| *H01M 10/613* | (2014.01) | |
| *F01P 5/10* | (2006.01) | |
| *B60K 1/00* | (2006.01) | |
| *B60L 50/15* | (2019.01) | |
| *B60L 50/16* | (2019.01) | |
| *F01P 3/18* | (2006.01) | |

(52) U.S. Cl.
CPC ............... *F01P 3/12* (2013.01); *F01P 7/165* (2013.01); *F02B 29/0412* (2013.01); *F02B 29/0443* (2013.01); *F02B 29/0493* (2013.01); *H01M 10/613* (2015.04); *H01M 10/625* (2015.04); *H01M 10/663* (2015.04); *B60K 2001/003* (2013.01); *B60K 2001/005* (2013.01); *B60L 50/15* (2019.02); *B60L 50/16* (2019.02); *B60L 2240/445* (2013.01); *F01P 7/164* (2013.01); *F01P 2003/185* (2013.01); *F01P 2005/105* (2013.01); *F01P 2007/146* (2013.01); *F01P 2025/08* (2013.01); *F01P 2025/32* (2013.01); *F01P 2025/36* (2013.01); *F01P 2025/50* (2013.01); *F01P 2050/24* (2013.01); *F01P 2060/02* (2013.01); *Y02T 10/146* (2013.01)

(58) Field of Classification Search
CPC ............ F01P 2050/24; F01P 2025/08; F01P 2025/2025; F01P 2025/32; F01P 2025/36; F01P 2025/50; F01P 2007/146; F01P 2003/182; F01P 2003/185; F01P 2003/187; F01P 2005/105; F02B 29/0493; F02B 29/0443; F02B 29/0412; H01M 10/613; H01M 10/663; H01M 10/625; B60K 11/02; B60K 11/04; B60K 2001/005; B60K 2001/003; B60W 20/00; B60W 10/30; B60H 1/00278; B60L 50/16; B60L 50/15; B60L 2240/445; Y02T 10/14

See application file for complete search history.

(56) References Cited

U.S. PATENT DOCUMENTS

| | | | |
|---|---|---|---|
| 9,561,704 B2* | 2/2017 | Enomoto | B60H 1/00485 |
| 9,623,719 B2* | 4/2017 | Hatakeyama | B60L 1/003 |
| 9,650,940 B2* | 5/2017 | Kakehashi | B60H 1/00885 |
| 2012/0183815 A1* | 7/2012 | Johnston | B60L 3/0046 |
| | | | 429/50 |
| 2015/0094893 A1* | 4/2015 | Hopkirk | F02D 29/02 |
| | | | 701/22 |

FOREIGN PATENT DOCUMENTS

| | | |
|---|---|---|
| JP | 2006-327325 | 12/2006 |
| JP | 2008-290636 | 12/2008 |
| JP | 2009-507717 | 2/2009 |
| JP | 2011-255879 | 12/2011 |
| JP | 2012-140771 | 7/2012 |
| JP | 2014-000906 | 1/2014 |
| JP | 2014-218135 | 11/2014 |

OTHER PUBLICATIONS

Japanese Office Action for corresponding JP Application No. 2016-242720, dated Sep. 4, 2018 (w/ machine translation).
Japanese Office Action for corresponding JP Application No. 2016-242720, dated Nov. 13, 2018 (w/ machine translation).

* cited by examiner

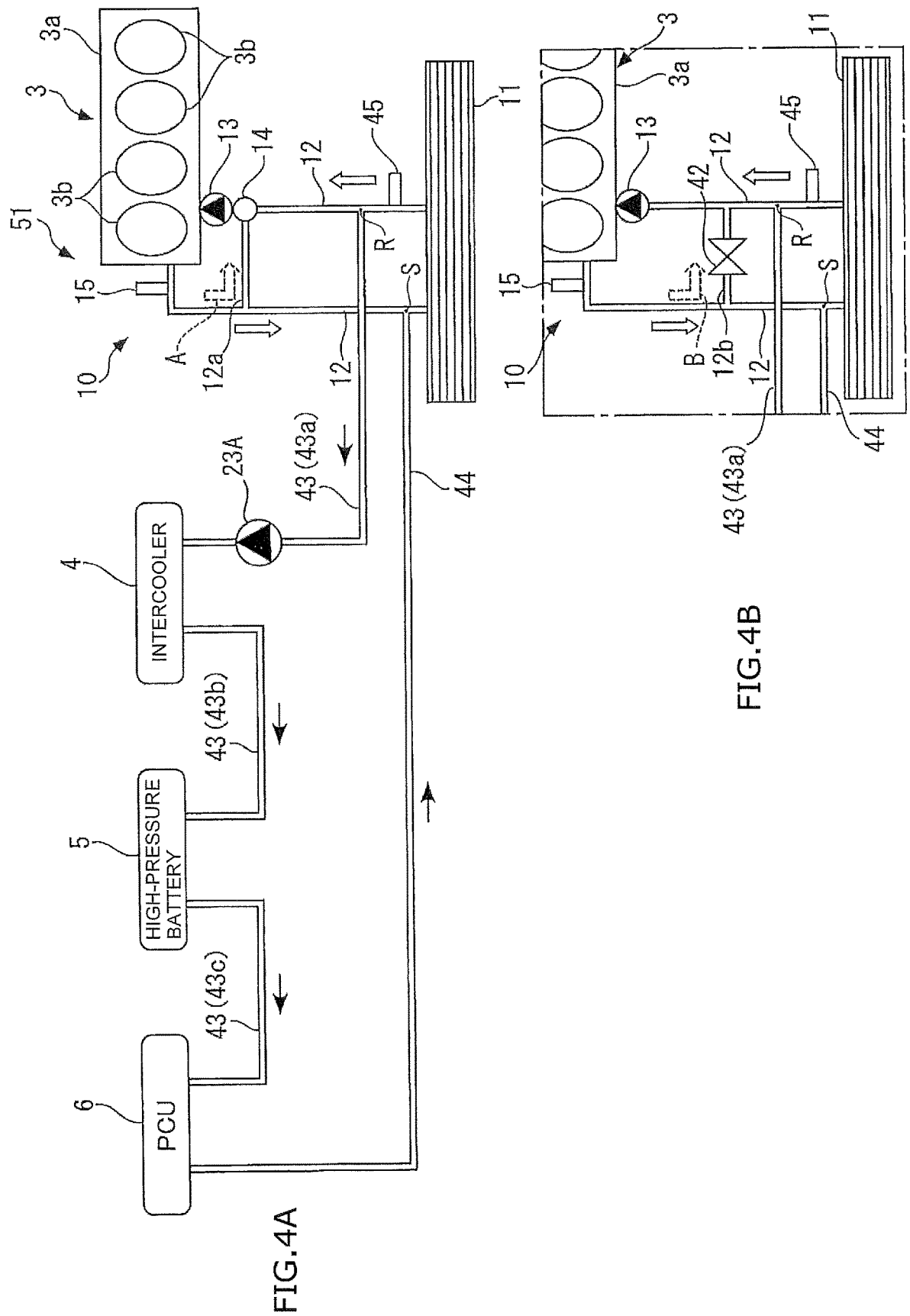

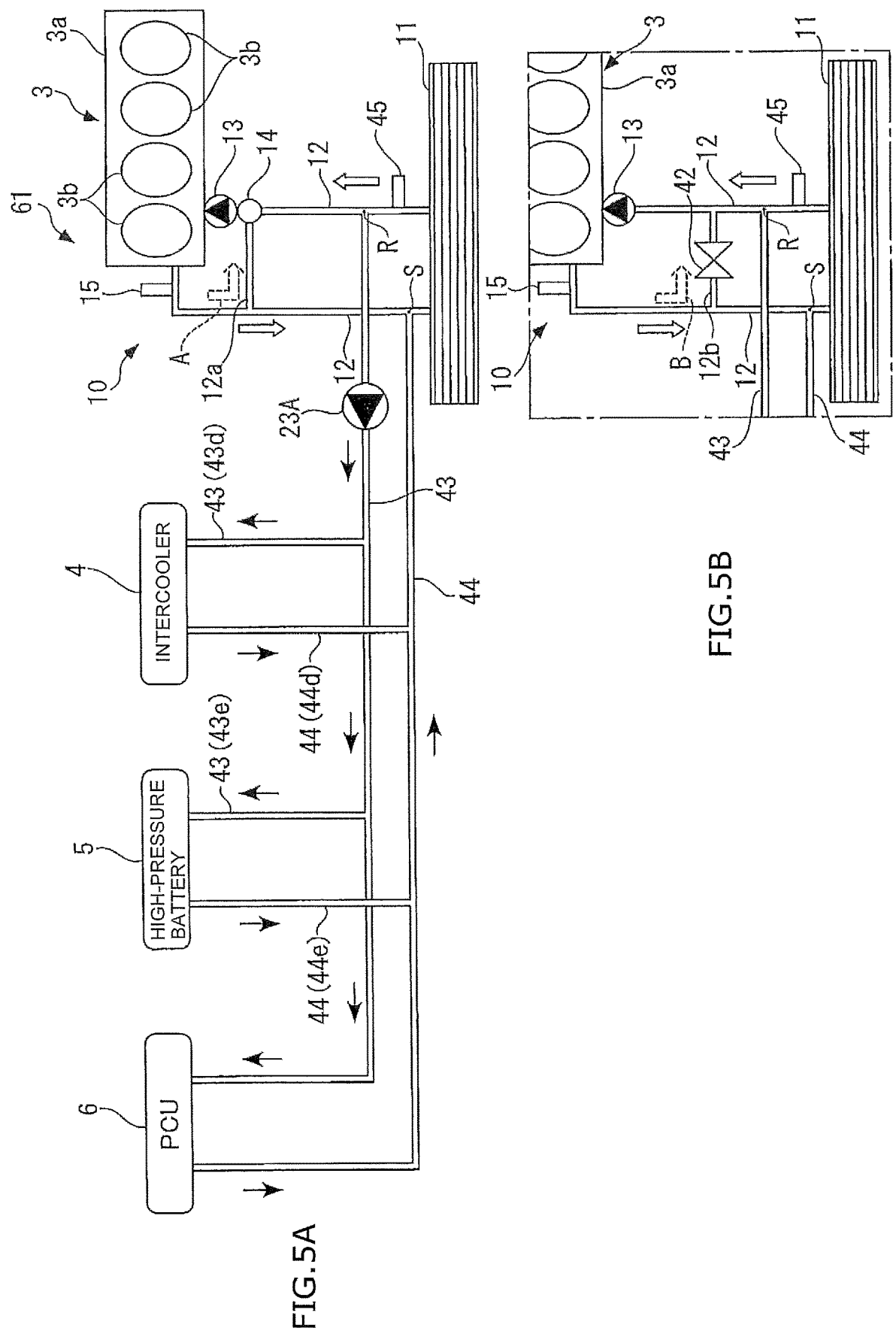

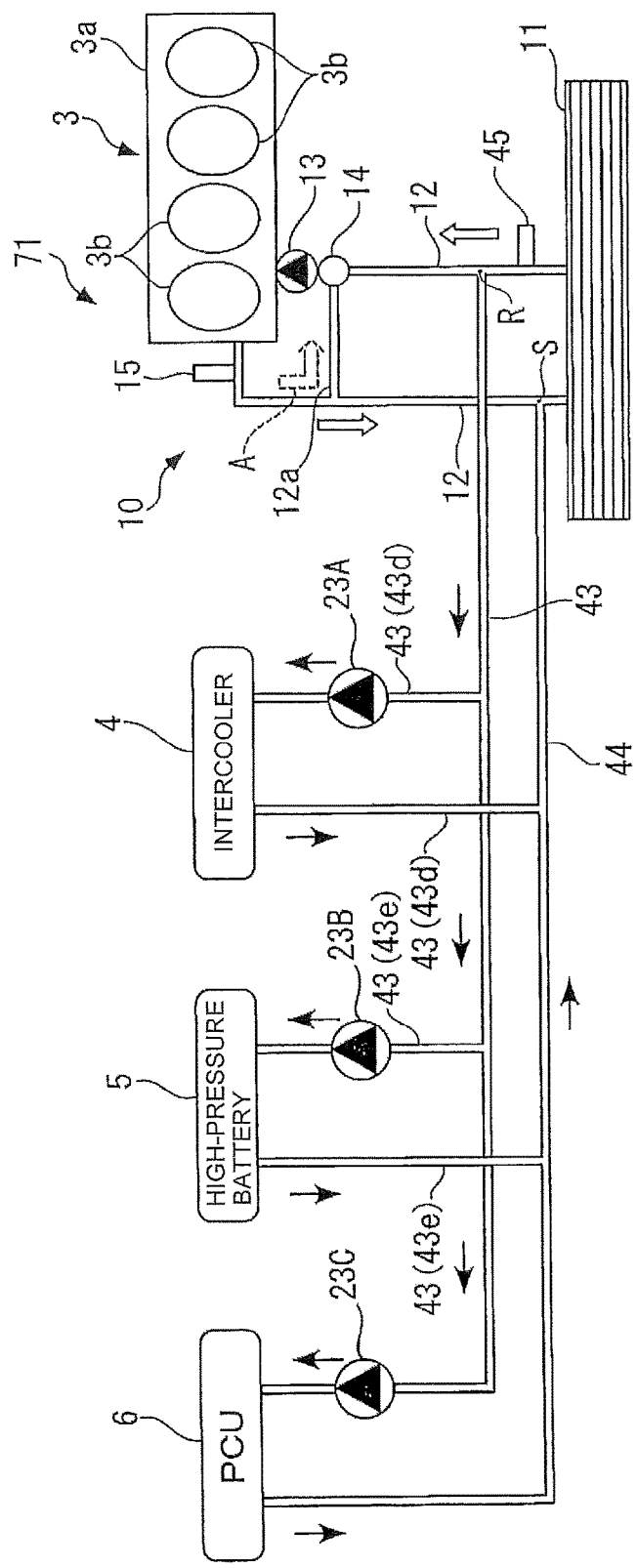
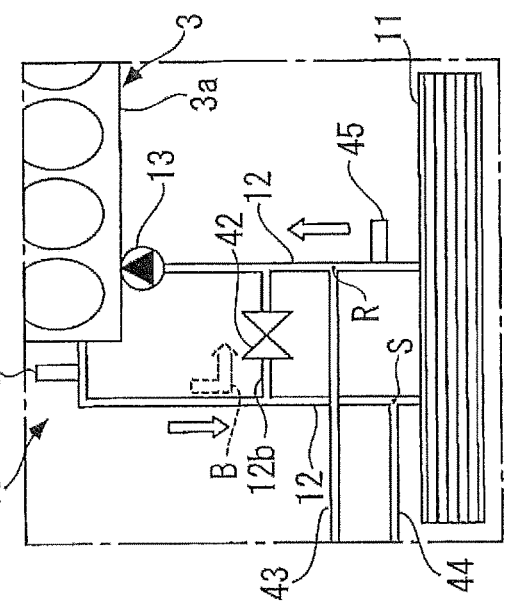
FIG.6A
FIG.6B

COOLING SYSTEM FOR VEHICLE

CROSS-REFERENCE TO RELATED APPLICATIONS

The present application claims priority under 35 U. S. C. § 119 to Japanese Patent Application No. 2016-242720 filed Dec. 14, 2016. The contents of this application are incorporated herein by reference in their entirety.

BACKGROUND OF THE INVENTION

Field of the Invention

The present invention relates to a cooling system for a vehicle.

Discussion of the Background

For example, a system disclosed in Japanese Patent Application Publication No. 2014-906 has been heretofore known as this type of cooling system. This cooling system includes first, second, and third cooling circuits each constituted of a single loop. These first, second, and third cooling circuits are respectively provided with first, second, and third pumps for pumping out and circulating coolant, and the second cooling circuit is provided with a medium-low temperature radiator and the third cooling circuit is provided with an engine radiator. The first and second cooling circuits are designed to cool multiple devices including an engine that need to be controlled at relatively low temperatures, e.g. a battery charger, an inverter, an electric motor, and a battery module, whereas the third cooling circuit is designed to cool multiple devices that need to be controlled at relatively high temperatures, e.g. a throttle, a supercharger, and a heat storage device. In addition, the first to third cooling circuits are provided with switching valves at multiple predetermined positions. The three cooling circuits composed of the first to third cooling circuits are designed to become single-loop or double-loop cooling circuits as a whole or return to three cooling circuits again through open/close control on these switching valves.

However, as described previously, since the existing cooling system changes the first to third cooling circuits to the single-loop or double-loop cooling circuits as a whole and returns them back to the three cooling circuits again, control of the multiple switching valves is complicated. In addition, since increase/decrease of coolant temperature relatively takes time, the system might not be able to cool the multiple devices to their control temperatures appropriately. Further, some kinds of devices may deteriorate in performance or malfunction and therefore fail to fully exert their original functions if their temperatures decrease too much due to cooling.

Meanwhile, as in a cooling system disclosed in Japanese Patent Application Publication No. 2006-327325 for example, by forming a cooling circuit with a radiator for each of multiple devices with different control temperatures, it is possible to cool these devices in each cooling circuit and control them at their suitable temperatures.

SUMMARY

According to one aspect of the present invention, a cooling system for a vehicle designed to cool multiple devices that need cooling so as to control the devices at respective predetermined temperatures, the system being characterized by including: a high-temperature cooling circuit having a high-temperature device being a device whose temperature at which the device should be controlled is the highest among the multiple devices, a high-temperature radiator, a high-temperature coolant passage being connected to the high-temperature device and the high-temperature radiator for circulating coolant therebetween, and a high-temperature pump being designed to pump out coolant to the high-temperature coolant passage and circulate the coolant therethrough; a low-temperature cooling circuit 20 having multiple low-temperature devices being the multiple devices other than the high-temperature device, a low-temperature radiator, a low-temperature coolant passage being connected to each of the multiple low-temperature devices and the low-temperature radiator for circulating coolant therebetween, and multiple low-temperature pumps being provided for the respective multiple low-temperature devices and designed to pump out coolant to the low-temperature coolant passage and circulate the coolant therethrough; and a coolant introduction passage being connected to the high-temperature cooling circuit and the low-temperature cooling circuit for introducing coolant in the high-temperature cooling circuit to a position between each of the multiple low-temperature devices and the low-temperature radiator in the low-temperature cooling circuit and upstream of the corresponding one of the multiple low-temperature devices.

According to another aspect of the present invention, a cooling system for a vehicle designed to cool multiple devices that need cooling so as to control the devices at respective predetermined temperatures, the system being characterized by including: a high-temperature cooling circuit having a high-temperature device being a device whose temperature at which the device should be controlled is the highest among the multiple devices, a high-temperature radiator, a high-temperature coolant passage being connected to the high-temperature device and the high-temperature radiator for circulating coolant therebetween, and a high-temperature pump being designed to pump out coolant to the high-temperature coolant passage and circulate the coolant therethrough; at least one low-temperature device being the multiple devices other than the high-temperature device; a low-temperature coolant passage being connected to the low-temperature device and the high-temperature coolant passage for circulating coolant between the low-temperature device and the high-temperature radiator; a low-temperature pump being installed in the low-temperature coolant passage and designed to circulate coolant between the low-temperature device and the high-temperature radiator; and a high-temperature radiator bypass passage being installed in the high-temperature coolant passage for introducing coolant having exchanged heat with the high-temperature device to a position upstream of the high-temperature device while bypassing the high-temperature radiator.

According to further aspect of the present invention, a cooling system for a vehicle, includes a first cooling circuit, a second cooling circuit, and a coolant introduction passage. The first cooling circuit includes a first device, a first radiator, a first coolant passage, and a first pump. The first coolant passage connects the first device and the first radiator. The first pump is provided in the first coolant passage to circulate coolant in the first cooling circuit so as to cool the first device to a first temperature. The second cooling circuit includes a second device, a second radiator, a second coolant passage, and a second pump. The second coolant passage connects the second device and the second radiator. The second pump is provided in the second coolant passage to circulate coolant in the second cooling circuit so as to cool the second device to a second temperature. The second temperature is lower than the first temperature. The coolant introduction passage connects the first cooling circuit and a connected portion of the second cooling circuit between the second device and the second radiator and upstream of the second device to supply the coolant in the first cooling circuit to the second cooling circuit.

According to further aspect of the present invention, a cooling system for a vehicle includes a first cooling circuit, at least one second device, a third coolant passage, a third pump, and a bypass passage. The first cooling circuit includes a first device, a first radiator, a first coolant passage, and a first pump. The first coolant passage connects the first device and the first radiator. The first pump is provided in the first coolant passage to circulate the coolant in the first coolant passage so as to cool the first device to a first temperature. The third coolant passage connects the at least one second device and the first coolant passage. The third pump is provided in the third coolant passage to circulate the coolant between the at least one second device and the first radiator in the third coolant passage so as to cool the at least one second device to a second temperature. The second temperature being lower than the first temperature. The bypass passage is provided in the first coolant passage and bypasses the first radiator such that the coolant having exchanged heat with the first device is introduced to a position at an upstream of the first device in the first coolant passage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 4A is a diagram illustrating a first modified example of the cooling system according to the second embodiment, and FIG. 4B is a diagram illustrated in the same manner as FIG. 3B.

FIG. 5A is a diagram illustrating a second modified example of the cooling system according to the second embodiment, and FIG. 5B is a diagram illustrated in the same manner as FIG. 3B.

FIG. 6A is a diagram illustrating a third modified example of the cooling system according to the second embodiment, and FIG. 6B is a diagram illustrated in the same manner as FIG. 3B.

DESCRIPTION OF THE EMBODIMENTS

Figure 1:
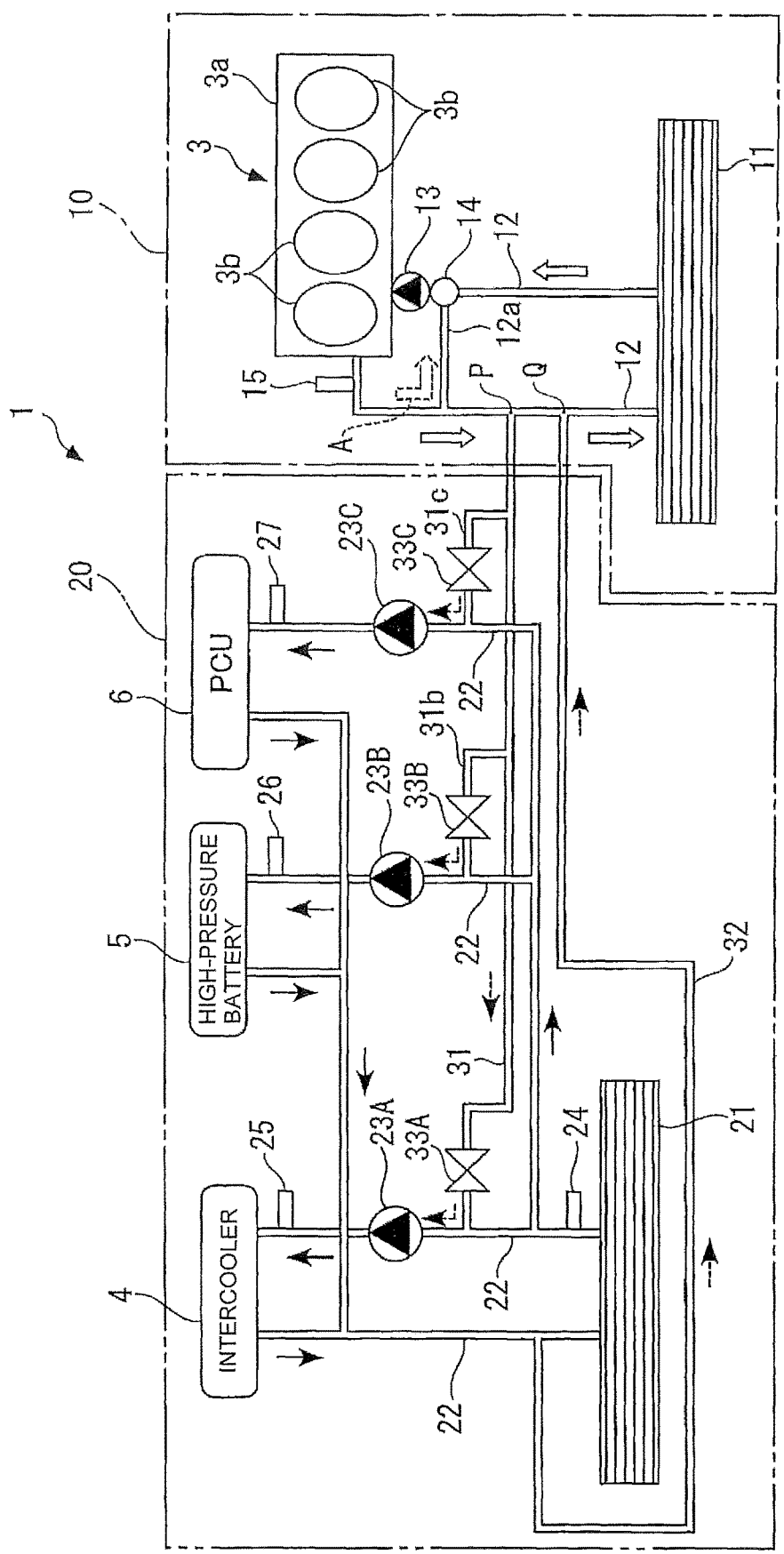
FIG. 1 is a diagram schematically illustrating, as well as an internal combustion engine, a cooling system according to a first embodiment of the present invention employed in a hybrid vehicle.
Figure 2:
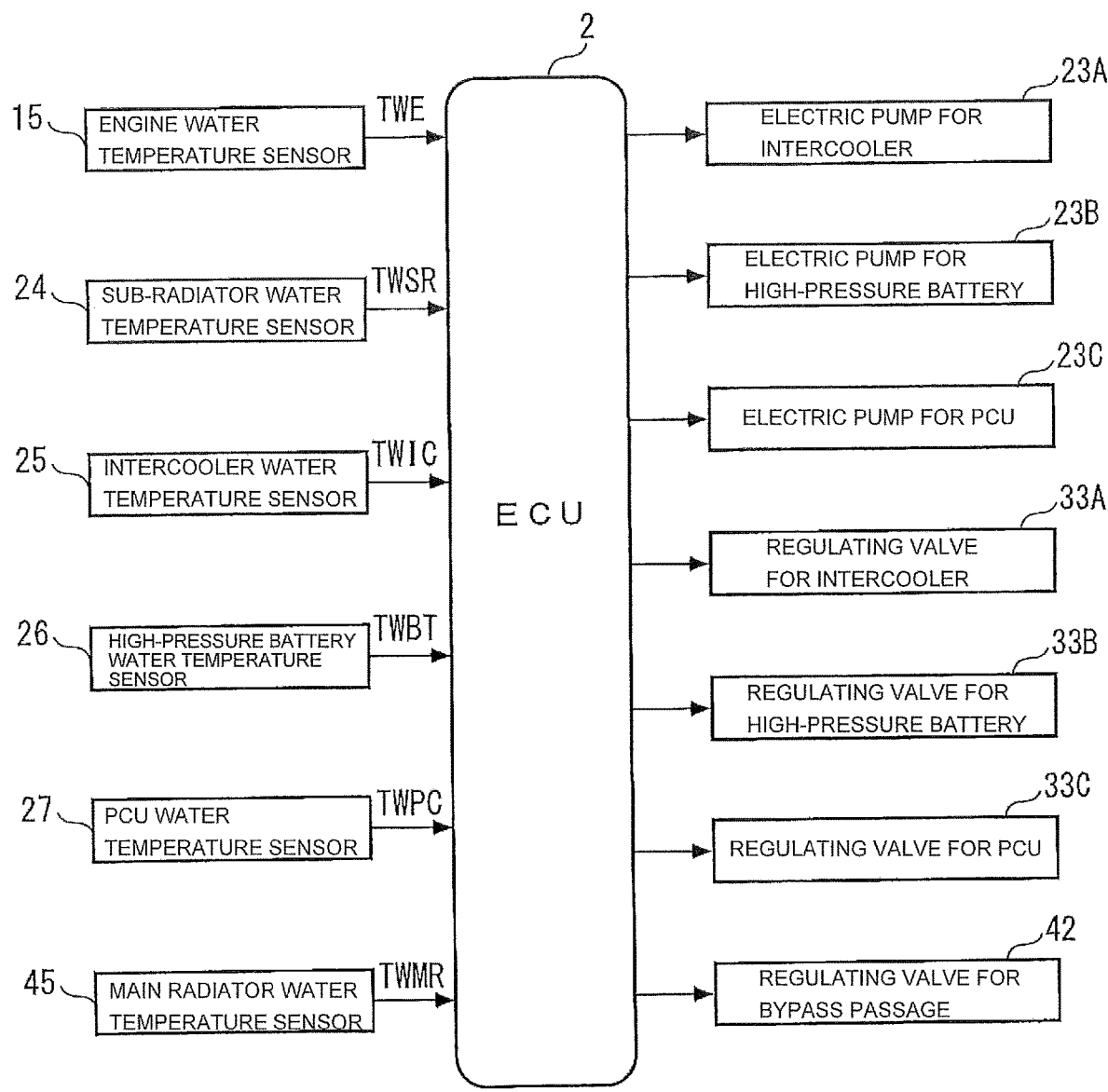
FIG. 2 is a block diagram illustrating a schematic configuration of a controller of the cooling system.

The embodiments will now be described with reference to the accompanying drawings, wherein like reference numerals designate corresponding or identical elements throughout the various drawings.

Hereinbelow, preferable embodiments of the present invention are described with reference to the drawings. FIG. 1 illustrates, as well as an internal combustion engine (hereinafter referred to as the "engine") 3, a cooling system 1 according to a first embodiment of the present invention employed in a hybrid vehicle. Note that, of the engine 3, FIG. 1 illustrates only an engine body 3*a* (high-temperature device or first device) where heat is produced by combustion.

The engine 3 is a gasoline engine having four cylinders 3*b*, and is mounted in the vehicle as a power source together with a motor (not illustrated). The engine body 3*a* has a water jacket (not illustrated) around the cylinders 3*b*, for example. The engine body 3*a* is cooled in such a way that coolant draws heat from the heat-producing engine body 3*a* when passing through the water jacket.

In addition, the engine 3 includes turbochargers and an EGR system (both of which are not illustrated). The turbochargers are installed in an intake passage and an exhaust passage of the engine 3 respectively, and each have a compressor and a turbine that are coupled together into one unit. A supercharging operation is carried out in such a way that, as the turbine is driven to rotate by exhaust gas flowing through the exhaust passage, the compressor is rotated integrally with the turbine, and thus pressurizes (supercharges) intake gas and sends the pressurized gas toward the cylinders 3*a*.

The intake passage of the engine 3 is provided with an intercooler 4 (low-temperature device or second device) for cooling the intake gas raised in temperature by the supercharging operation. The intercooler 4 is a water-cooled intercooler, and cools the intake gas, whose temperature has been raised, by heat exchange with coolant flowing through the inside of the intercooler.

Meanwhile, the EGR system is configured to reflux a part of exhaust gas, exhausted into the exhaust passage, to the intake passage as EGR gas, and is constituted of an EGR passage, an EGR valve, an EGR cooler, etc. The EGR passage connects a predetermined position of the exhaust passage and a position of the intake passage upstream of the compressor of the turbocharger. The opening of the EGR valve is controlled by an ECU 2, which controls the amount of EGR gas to be refluxed from the exhaust passage to the intake passage. The EGR cooler is installed in the EGR passage, and cools the high-temperature EGR gas flowing through the EGR passage by use of the coolant cooling the engine body 3*a*.

Further, a high-pressure battery 5 (low-temperature device or second device) and a PCU 6 (low-temperature device or second device) are electrically connected to the motor as a drive source of the vehicle. The high-pressure battery 5 is formed from a lithium-ion battery, for example, and configured to supply electricity to the motor. Meanwhile, the PCU 6 is constituted of: a boost converter configured to boost the pressure of the high-pressure battery 5; an inverter configured to convert a direct-current voltage into an alternating-current voltage; and the like.

Since all of the intercooler 4, the high-pressure battery 5, and the PCU 6 described above generate heat during operation, they need to be cooled for keeping their favorable operation, and they have their suitable temperatures for favorable operation. For example, it is preferable that the intercooler 4 be kept at about 40° C., the high-pressure battery 5 be kept at about 50° C., and the PCU 6 be kept at 50° C. or lower. Accordingly, the high-pressure battery 5 and the PCU 6 are designed so that coolant flows through their outer circumferences, and they as well as the above intercooler 4 are cooled and controlled at their suitable temperatures for operation (hereinafter referred to as the "control temperature") by the cooling system 1. Note that, in the following description, the intercooler 4, the high-pressure battery 5, and the PCU 6 described above which are the low-temperature devices according to the embodiment of the present invention shall be collectively referred to as the "low-temperature device" unless otherwise distinguished.

As illustrated in FIG. 1, the cooling system 1 includes: a high-temperature cooling circuit 10 (first cooling circuit) which is configured to cool the engine body 3a and through which relatively high-temperature coolant circulates; and a low-temperature cooling circuit 20 (second cooling circuit) which is configured to cool the intercooler 4, the high-pressure battery 5, and the PCU 6 and through which relatively low-temperature coolant circulates.

The high-temperature cooling circuit 10 includes, for example: the engine body 3a; a main radiator 11 (high-temperature radiator or first radiator); a coolant passage 12 (high-temperature coolant passage or first coolant passage) which is connected to the engine body 3a and the main radiator 11 and filled with coolant; a coolant pump 13 (high-temperature pump or first pump) which is a mechanical pump driven by the engine 3 or an electric pump driven by application of power; and a thermostat 14 whose valve opens or closes depending on the temperature of coolant.

As illustrated in FIG. 1, in the high-temperature cooling circuit 10, while the engine 3 is in operation, coolant is pumped by the coolant pump 13, and then flows and circulates in the counterclockwise direction of FIG. 1 by way of the coolant passage 12.

Specifically, immediately after the start of the engine 3, because the temperature of coolant is relatively low and the valve of the thermostat 14 closes, a bypass passage 12a of the coolant passage 12 opens and the coolant passage 12 in a portion downstream of the main radiator 11 closes. Thereby, as depicted by a dashed outline arrow A in FIG. 1, the coolant flows and circulates in the counterclockwise direction via the bypass passage 12a without flowing through the main radiator 11. In this case, the temperature of the coolant increases due to generation of heat by combustion in the engine body 3a, whereby the engine 3 is warmed up.

Then, when the temperature of the coolant increases and becomes a predetermined temperature or higher, the valve of the thermostat 14 opens, and thus the bypass passage 12a closes and the coolant passage 12 in the portion downstream of the main radiator 11 opens. Thereby, as depicted by outline arrows in FIG. 1, the coolant flows and circulates in the counterclockwise direction via the coolant passage 12. In this case, the coolant draws heat from the engine body 3a to cool the engine body 3a when passing through the engine body 3a, and releases the heat to the main radiator 11 when passing through the main radiator 11. Because the temperature of the engine body 3a is normally high through its combustion and generation of heat, the coolant flowing through the high-temperature cooling circuit 10 has a relatively high temperature (hereinafter referred to as the "high-temperature coolant").

A temperature (hereinafter referred to as the "engine water temperature") TWE of the high-temperature coolant having cooled the engine body 3a is detected by an engine water temperature sensor 15 placed at a predetermined position in the coolant passage 12, e.g. immediately downstream of the engine body 3a, and a detection signal from this sensor is output to the ECU 2.

On the other hand, the low-temperature cooling circuit 20 includes, for example: a set of the intercooler 4, the high-temperature battery 5, and the PCU 6; a sub-radiator 21 (low-temperature radiator or second radiator); a coolant passage 22 (low-temperature coolant passage or second coolant passage) for circulating coolant through the above low-temperature devices 4 to 6 and the sub-radiator 21; and three electric pumps 23A, 23B, and 23C (low-temperature pump or second pump) which are installed to correspond respectively to the intercooler 4, the high-pressure battery 5, and the PCU 6 and configured to pump coolant.

In the low-temperature cooling circuit 20, the intercooler 4, the high-temperature battery 5, and the PCU 6 are connected in parallel to one another via the coolant passage 22, and they each form a loop with the sub-radiator 21 for letting coolant circulate therethrough. In the coolant passage 22 forming these loops, the three electric pumps 23A, 23B, and 23C are each installed upstream of a corresponding one of the intercooler 4, the high-pressure battery 5, and the PCU 6. In addition, the amount of coolant to be pumped by each of these electric pumps 23A, 23B, and 23C is controlled by a control signal from the ECU 2.

In response to actuation of the electric pump 23A, coolant flows and circulates in the counterclockwise direction (in a direction of black solid arrows) of FIG. 1 by way of the coolant passage 22 located between the intercooler 4 and the sub-radiator 21. In this case, the coolant draws heat from intake gas flowing through the intercooler 4 to cool this when passing through the intercooler 4, and releases the heat when passing through the sub-radiator 21. Note that, in the following description, coolant flowing through the low-temperature cooling circuit 20 shall be referred to as "low-temperature coolant".

Further, in the same manner, in response to actuation of the electric pumps 23B and 23C, low-temperature coolant flows and circulates in the counterclockwise direction (in a direction of black solid arrows) of FIG. 1 by way of the coolant passage 22 located between the high-pressure battery 5/the PCU 6 and the sub-radiator 21. In this case, the low-temperature coolant having been pumped by the electric pump 23B draws heat from the high-pressure battery 5 to cool this when passing through the high-pressure battery 5, and releases the heat when passing through the sub-radiator 21. Likewise, the low-temperature coolant having been pumped by the electric pump 23C draws heat from the PCU 6 to cool this when passing through the PCU 6, and releases the heat when passing through the sub-radiator 21.

A temperature (hereinafter referred to as the "sub-radiator water temperature") TWSR of the above low-temperature coolant immediately after heat release to the sub-radiator 21 is detected by a sub-radiator water temperature sensor 24 placed at a predetermined position in the coolant passage 22, e.g. immediately downstream of the sub-radiator 21, and a detection signal from this sensor is output to the ECU 2.

In addition, a temperature (hereinafter referred to as the "intercooler water temperature") TWIC of the low-temperature coolant passing through the intercooler 4 is detected by an intercooler water temperature sensor 25 placed at a predetermined position in the coolant passage 22, e.g. immediately upstream of the intercooler 4, and a detection signal from this sensor is output to the ECU 2. Further, a temperature (hereinafter referred to as the "high-pressure battery water temperature") TWBT of the low-temperature coolant passing through the high-pressure battery 5 is detected by a high-pressure battery water temperature sensor 26 placed at a predetermined position in the coolant passage 22, e.g. immediately upstream of the high-pressure battery 5, and a detection signal from this sensor is output to the ECU 2. Likewise, a temperature (hereinafter referred to as the "PCU water temperature") TWPC of the low-temperature coolant passing through the PCU 6 is detected by a PCU water temperature sensor 27 placed at a predetermined position in the coolant passage 22, e.g. immediately upstream of the PCU 6, and a detection signal from this sensor is output to the ECU 2.

As illustrated in FIG. 1, the high-temperature cooling circuit 10 and the low-temperature cooling circuit 20 having the above configurations are connected to each other via a coolant introduction passage 31 and a coolant return passage 32.

The coolant introduction passage 31 is connected to the coolant passage 12 of the high-temperature cooling circuit 10 at a predetermined position (a position P in FIG. 1) downstream of the engine body 3a and upstream of the main radiator 11, and to the coolant passage 22 of the low-temperature cooling circuit 20 at positions downstream of the sub-radiator 21 and upstream of the three electric pumps 23A, 23B, and 23C. Here, branching passages 31b and 31c that branch off from the coolant introduction passage 31 as their main passage are connected respectively to the positions upstream of the electric pumps 23B and 23C of the coolant passage 22.

In addition, regulating valves 33A, 33B, and 33C for regulating the amount of introduced high-temperature coolant are installed in the coolant introduction passage 31 at a predetermined position close to the electric pump 23A and in the above branching passages 31b and 31c, respectively. The opening of each of these regulating valves 33A, 33B, and 33C is designed to be regulatable. By controlling the openings of the regulating valves 33A, 33B, and 33C in response to control signals from the ECU 2, the amount of introduced high-temperature coolant to pass through these valves is regulated.

On the other hand, the coolant return passage 32 is connected to the coolant passage 22 of the low-temperature cooling circuit 20 at a position downstream of the intercooler 4 and upstream of the sub-radiator 21, and to the coolant passage 12 of the high-temperature cooling circuit 10 at a predetermined position (a position Q in FIG. 1) downstream of the position P and upstream of the main radiator 11.

Meanwhile, the ECU 2 is constituted of a microcomputer composed of a CPU, a RAM, a ROM, an I/O interface, etc. (none of which is illustrated). The ECU 2 is configured to control, in response to detection signals from the various water temperature sensors 15 and 24 to 27 described above and the like, the flow rates and temperatures of low-temperature coolant and high-temperature coolant according to a predetermined control program by means of the electric pumps 23A, 23B, and 23C, the regulating valves 33A, 33B, and 33C, etc. Note that, in this embodiment, the ECU 2 corresponds to a target temperature setting unit or a target temperature setting device, a low-temperature coolant pump-out amount setting unit or a second pump coolant supply amount setting device, a high-temperature coolant introduction amount calculating unit or a coolant introduction amount calculator, a regulating valve controlling unit or a regulating valve controller, and a pump controlling unit or a pump controller according to the embodiment of the present invention.

In the cooling system 1 having the above configuration, when the coolant pump 13 and the electric pumps 23A, 23B, and 23C are actuated and all of the regulating valves 33A, 33B, and 33C are closed after the warm-up of the engine 3, no coolant flows in/out between the high-temperature cooling circuit 10 and the low-temperature cooling circuit 20. In this case, as illustrated in FIG. 1, high-temperature coolant circulates in the counterclockwise direction depicted by the outline arrows in the high-temperature cooling circuit 10; on the other hand, in the low-temperature cooling circuit 20, low-temperature coolant circulates in the counterclockwise direction depicted by the black solid arrows.

Here, the amount of low-temperature coolant to be pumped by each of the above three electric pumps 23A, 23B, and 23C is set in advance according to the amount of heat discharged from the corresponding one of the intercooler 4, the high-pressure battery 5, and the PCU 6. Accordingly, the ECU 2 controls the number of revolutions of each of the above electric pumps 23A, 23B, and 23C so that the pump may pump out the previously set amount of low-temperature coolant to be pumped.

On the other hand, when the regulating valves 33A, 33B, and 33C open, as depicted by black dashed arrows in FIG. 1, a part of high-temperature coolant in the high-temperature cooling circuit 10 is introduced into the loops respectively containing the intercooler 4, the high-pressure battery 5, and the PCU 6 of the low-temperature cooling circuit 20 by way of the coolant introduction passage 31. In this case, as depicted by black dashed arrows in FIG. 1, the same amount of low-temperature coolant as the introduced high-temperature coolant is returned to the high-temperature cooling circuit 10 by way of the coolant return passage 32. Further, in this case, the openings of the regulating valves 33A, 33B, and 33C are controlled in the following manner.

For example, when high-temperature coolant is mixed with low-temperature coolant by opening the regulating valve 33A in the loop containing the intercooler 4, the following equation (1) is satisfied as to the amount of heat resulting from the temperature and flow rate of coolant:

$$TMIX \times QEWP = TWE \times QVLV + TWSR \times (QEXP - QVLV) \quad (1).$$

TMIX: the temperature of mixed coolant obtained by mixing high-temperature coolant with low-temperature coolant QEWP: the amount of coolant to be pumped by the electric pump (hereinafter referred to as a "pump flow rate")

TWE: high-temperature coolant temperature

QVLV: the flow rate of high-temperature coolant passing through the regulating valve (hereinafter referred to as a "valve flow rate")

TWSR: sub-radiator water temperature

Further, by deforming the equation (1) above, the valve flow rate QVLV of the regulating valve 33A is expressed by the following equation (2):

$$QVLV = (TMIX - TWSR)/(TWE - TWSR) \times QEWP \quad (2).$$

Then, the opening of the regulating valve 33A is calculated and the regulating valve 33A is subjected to feedforward control so that the above temperature of mixed coolant (mixed coolant temperature) TMIX may become the control temperature of the intercooler 4 as its target value. Specifically, the valve flow rate QVLV of the regulating valve 33A is calculated by assigning the control temperature of the intercooler 4 to the mixed coolant temperature TMIX in the above equation (2) and, based on the resultant value, the opening of the regulating valve 33A is calculated. Then, the opening of the regulating valve 33A is controlled at the calculated value in response to a control command from the ECU 2.

Here, the valve flow rate QVLV of the regulating valve 33A is calculated for every predetermined time period because it varies depending on the sub-radiator water temperature TWSR, the high-temperature coolant temperature TWE, and the pump flow rate QEWP of the electric pump 23A. Accordingly, if the valve flow rate QVLV of the regulating valve 33A differs from that calculated last time, the opening of the regulating valve 33A is controlled according to the flow rate QVLV calculated this time.

Further, due to reasons such as error in precision of each component in the cooling system 1, the actual temperature of coolant after mixture of high-temperature coolant and low-temperature coolant, e.g. the intercooler water temperature TWIC detected by the intercooler water temperature sensor 25, sometimes deviates from the control temperature as the target value of the intercooler 4. In this case, according to this deviation (temperature difference), the opening of the regulating valve 33A is regulated and the valve flow rate QVLV is subjected to feedback correction.

Specifically, in the case of correcting the valve flow rate QVLV of the regulating valve 33A corresponding to the intercooler 4, an estimated value of the intercooler water temperature TWIC (hereinafter referred to as the "estimated water temperature") is calculated in consideration of delay in transportation of the mixed coolant. Next, based on a temperature difference between the estimated water temperature thus calculated and the intercooler water temperature TWIC as the actually detected value, the amount of correction of high-temperature coolant to pass through the regulating valve 33A is calculated. Then, the amount of correction thus calculated is added to the calculation result of the above equation (2) to correct the valve flow rate QVLV of the regulating valve 33A. Thereafter, the opening of the regulating valve 33A is calculated based on the corrected valve flow rate QVLV, and the opening of the regulating valve 33A is controlled at this valve. By subjecting the valve flow rate QVLV of the regulating valve 33A to feedback correction in the above manner, the intercooler water temperature TWIC can be precisely adjusted to the control temperature of the intercooler 4.

The above control on the regulating valve 33A corresponding to the intercooler 4 is performed in the same manner in the case of controlling the regulating valves 33B and 33C corresponding respectively to the high-pressure battery 5 and the PCU 6.

As has been described above, according to this embodiment, by way of the coolant introduction passage 31 connected to the high-temperature cooling circuit 10 and the low-temperature cooling circuit 20, high-temperature coolant is introduced between the set of the intercooler 4, the high-temperature battery 5, and the PCU 6 and the sub-radiator 21 and to the upstream sides of these low-temperature devices 4 to 6 and is mixed with low-temperature coolant. In this case, according to the control temperatures of the respective low-temperature devices 4 to 6, the engine water temperature TWE, the sub-radiator water temperature TWSR, the intercooler water temperature TWIC, the high-pressure battery water temperature TWBT, the PCU water temperature TWPC, and the pump flow rates QEWP of the respective electric pumps 23A to 23C, the openings of the regulating valves 33A, 33B, and 33C are respectively controlled to introduce the amounts of high-temperature coolant suitable for cooling the intercooler 4, the high-pressure battery 5, and the PCU 6, respectively. Thereby, the intercooler 4, the high-pressure battery 5, and the PCU 6 can be cooled to their appropriate temperatures by low-temperature coolant so as to be kept at their control temperatures without being cooled too much.

In addition, since the heat of low-temperature coolant for the intercooler 4, the high-pressure battery 5, and the PCU 6 is released by the single sub-radiator 21, it is possible to reduce the number of radiators mounted in the vehicle as compared to a cooling system having a radiator for each device.

Next, a second embodiment of the present invention is described with reference to FIGS. 3 to 6. Unlike the cooling system 1 of the first embodiment equipped with the two radiators (the main radiator 11 and the sub-radiator 21), the second embodiment provides a cooling system that uses a single radiator to cool multiple devices that need cooling. Note that, in the following description, the same constituents as those of the first embodiment are given the same reference numerals and not described in detail.

Figures 3A, 3B:
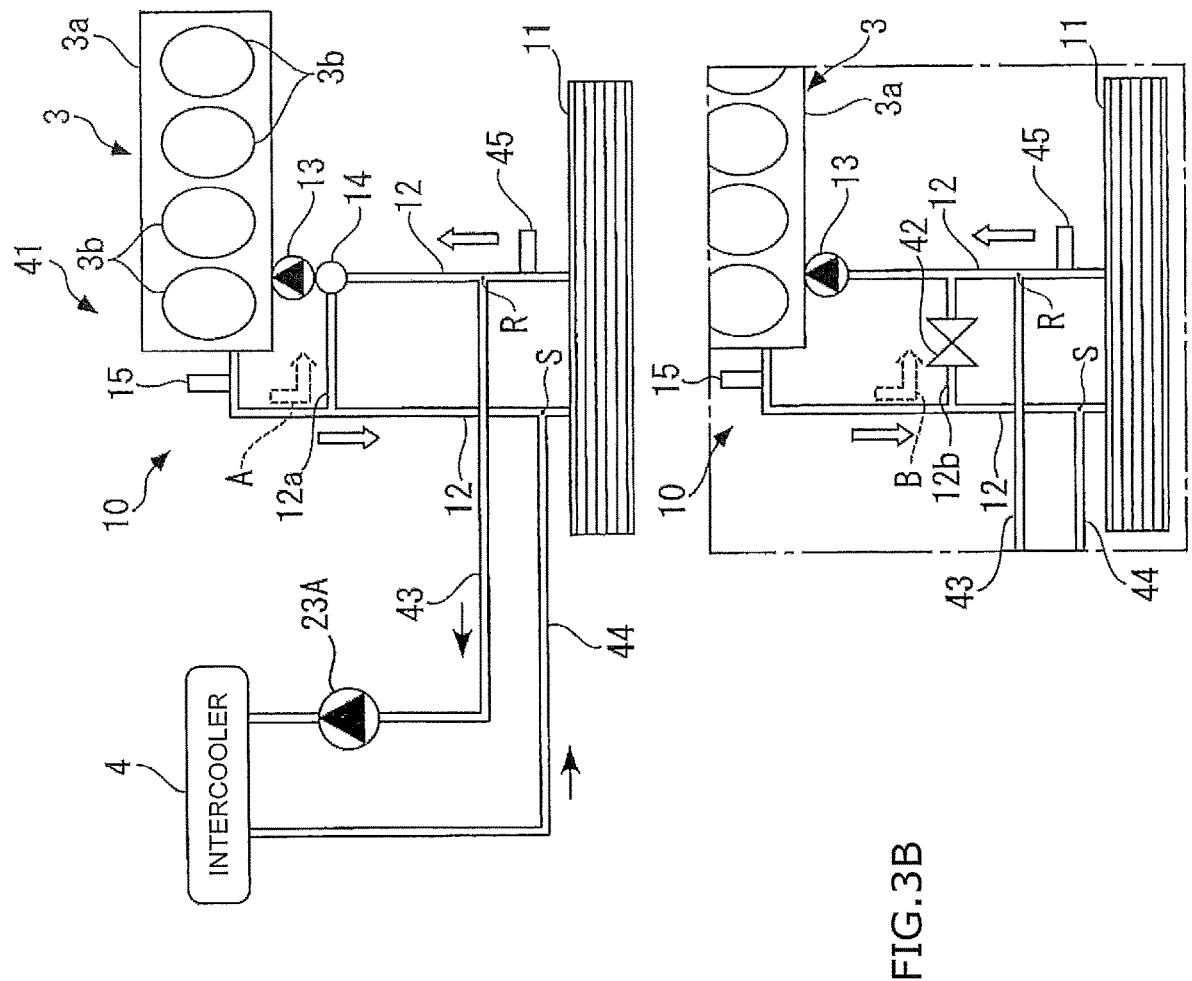
FIG. 3A is a diagram schematically illustrating, as well as an internal combustion engine, a cooling system according to a second embodiment of the present invention employed in a hybrid vehicle.
FIG. 3B is a diagram partially illustrating a cooling system provided with a bypass passage with a regulating valve, instead of a thermostat in FIG. 3A, in a high-temperature coolant passage.

FIG. 3(a) illustrates a cooling system 41 that uses the single main radiator 11 to cool the engine body 3a and the intercooler 4. As illustrated in FIG. 3A, like the high-temperature cooling circuit 10 of the first embodiment described above, the cooling system 41 includes: the engine body 3a; the main radiator 11; the coolant passage 12; the bypass passage 12a (high-temperature radiator bypass passage); the coolant pump 13; and the thermostat 14 (regulating valve). Meanwhile, as illustrated in FIG. 3B, the above cooling system 41 may be provided with a regulating valve-equipped bypass passage 12b (high-temperature radiator bypass passage) in place of the bypass passage 12a and the thermostat 14 described above. A regulating valve 42 of the bypass passage 12b has the same configuration as each of the above regulating valves 33A to 33C of the first embodiment.

In addition, a coolant feed passage 43 (low-temperature coolant passage) for feeding coolant toward the intercooler 4 and a coolant return passage 44 (low-temperature coolant passage) for returning coolant having passed through the intercooler 4 toward the main radiator 11 are connected to the coolant passage 12 and the intercooler 4 of the cooling system 41. The coolant feed passage 43 is connected to the intercooler 4 and the coolant passage 12 of the high-temperature cooling circuit 10 at a predetermined position (a position R in FIGS. 3A and 3B) downstream of the main radiator 11 and upstream of the thermostat 14 or closer to the main radiator 11 than a point of connection with the downstream end of the regulating valve-equipped bypass passage 12b. Moreover, the coolant feed passage 43 is provided with the same electric pump 23A as in the first embodiment along the way. On the other hand, the coolant return passage 44 is connected to the intercooler 4 and the coolant passage 12 at a predetermined position (a position S in FIGS. 3A and 3B) upstream of the main radiator 11 and closer to the main radiator 11 than a point of connection with the upstream end of the bypass passage 12a or the regulating valve-equipped bypass passage 12b.

Further, a temperature (hereinafter referred to as the "main radiator water temperature") TWMR of coolant immediately after heat release to the main radiator 11 is detected by a main radiator water temperature sensor 45 placed in the coolant passage 12 at a position immediately downstream of the main radiator 11, and a detection signal from this sensor is output to the ECU 2.

In the cooling system 41 of FIG. 3A having the above configuration, immediately after the start of the engine 3, as in the first embodiment described above, coolant in the coolant passage 12 flows and circulates in the counterclockwise direction of FIG. 3 A via the bypass passage 12a without flowing through the main radiator 11 as depicted by a dashed outline arrow A in FIG. 3A. Then, when the temperature of the coolant increases and becomes a predetermined temperature or higher, as in the first embodiment, the coolant flows and circulates through the engine body 3a and the main radiator 11 in the counterclockwise direction via the coolant passage 12 as depicted by outline arrows in FIG. 3A.

On the other hand, in the cooling system of FIG. 3B, immediately after the start of the engine 3, the regulating valve 42 opens, and thus coolant in the coolant passage 12 partially flows and circulates in the counterclockwise direction via the bypass passage 12b as depicted by a dashed outline arrow B in FIG. 3B. Then, when the temperature of the coolant increases and becomes the predetermined temperature or higher, the regulating valve 42 closes, and thus the coolant flows and circulates as depicted by outline arrows in FIG. 3B like FIG. 3A described above.

Further, in response to actuation of the electric pump 23A, a part of low-temperature coolant having released heat to the main radiator 11 flows toward the intercooler 4 via the coolant feed passage 43. Then, the coolant having passed through the intercooler 4 flows toward the main radiator 11 via the coolant return passage 44. In this way, by actuation of the electric pump 23A, the coolant flows and circulates through the intercooler 4 and the main radiator 11 in the counterclockwise direction of FIGS. 3A and 3B via the coolant feed passage 43 and the coolant return passage 44.

As described above, the temperature of coolant, after heat release to the main radiator 11, suitable for cooling the intercooler 4 is relatively low. In this case, in the cooling system 41 of FIG. 3A, the bypass passage 12a is partially or fully opened by the thermostat 14 in order to cool the engine body 3a appropriately without cooling it too much. On the other hand, in the cooling system 41 of FIG. 3B, the regulating valve 42 of the regulating valve-equipped bypass passage 12b is opened at an opening determined according to the main radiator water temperature TWMR detected by the main radiator water temperature sensor 45. By opening the thermostat 14 or the regulating valve 42 as described above, high-temperature coolant having passed through the engine body 3a is partially or fully introduced to the upstream side of the engine body 3a without flowing through the main radiator 11. Further, in this case, it is preferable to adjust the cooling performance of the main radiator 11 so that the intercooler 4 can be cooled to its control temperature, by actuating a movable grille shutter (not illustrated) typically placed in front of the main radiator 11 in the vehicle and thereby adjusting the amount of traveling wind hitting the main radiator 11 during traveling of the vehicle.

As described above, according to this embodiment, it is possible to cool the intercooler 4 being the low-temperature device as well as adjust the temperature of the engine body 3a properly using the main radiator 11 which is the single radiator, and to cool the engine body 3a and the intercooler 4 to their control temperatures different from each other.

FIGS. 4, 5, and 6 respectively illustrate three modified examples of the above second embodiment providing cooling systems cooling the high-pressure battery 5 and the PCU 6 in addition to the intercooler 4 as the low-temperature devices as in the first embodiment described above.

In a cooling system 51 according to a first modified example illustrated in FIG. 4A, the intercooler 4, the high-pressure battery 5, and the PCU 6 are connected to one another in series by way of the coolant feed passage 43 and the coolant return passage 44. More specifically, the intercooler 4 is connected to a predetermined position R of the coolant passage 12 of the high-temperature cooling circuit 10 via a first passage 43a of the coolant feed passage 43, the intercooler 4 and the high-pressure battery 5 are connected to each other via a second passage 43b of the coolant feed passage 43, and the high-pressure battery 5 and the PCU 6 are connected to each other via a third passage 43c of the coolant feed passage 43. In addition, the PCU 6 is connected to a predetermined position S of the coolant passage 12 via the coolant return passage 44. Further, the above first passage 43a is provided with the electric pump 23A. Note that, as illustrated in FIG. 4B, the cooling system 51 of the first modified example can be provided with the regulating valve-equipped bypass passage 12b instead of the bypass passage 12a and the thermostat 14 in FIG. 4A like the cooling system 41 of FIG. 3B described above.

In the cooling system 51, in response to actuation of the electric pump 23A, a part of coolant having released heat to the main radiator 11 flows toward the intercooler 4 via the first passage 43a of the coolant feed passage 43. The coolant having passed through the intercooler 4 flows to the high-pressure battery 5 via the second passage 43b, and the coolant having passed therethrough flows to the PCU 6 via the third passage 43c. Then, the coolant having passed through the PCU 6 flows toward the main radiator 11 via the coolant return passage 44.

In the case where the control temperatures of the intercooler 4, the high-pressure battery 5, and the PCU 6 are higher in this order, by sequentially passing through the intercooler 4, the high-pressure battery 5, and the PCU 6 as described above and drawing heat from these low-temperature devices 4 to 6 when passing therethrough, coolant can cool the low-temperature devices 4 to 6 to their control temperatures while gradually increasing in temperature.

Meanwhile, in a cooling system 61 according to a second modified example illustrated in FIG. 5A, the intercooler 4, the high-pressure battery 5, and the PCU 6 are connected to one another in parallel by way of the coolant feed passage 43 and the coolant return passage 44. More specifically, the intercooler 4 and the high-pressure battery 5 are respectively connected to branching passages 43d and 43e that branch off from the coolant feed passage 43 as their main passage, and the PCU 6 is connected to the coolant feed passage 43. In addition, the intercooler 4 and the high-pressure battery 5 are connected to branching passages 44d and 44e that branch off from the coolant return passage 44 as their main passage, and the PCU 6 is connected to the coolant return passage 44. Further, the electric pump 23A is installed in the coolant feed passage 43 at a position upstream of the branching passage 43d. Note that, as illustrated in FIG. 5B, the cooling system 61 of the second modified example can be provided with the regulating valve-equipped bypass passage 12b instead of the bypass passage 12a and the thermostat 14 in FIG. 5A like the cooling system 41 of FIG. 3B described above.

In the cooling system 61, in response to actuation of the electric pump 23A, a part of coolant having released heat to the main radiator 11 flows to the intercooler 4, the high-pressure battery 5, and the PCU 6 via the coolant feed passage 43 and its branching passages 43d and 43e. Then, the coolant having passed through the intercooler 4, the high-pressure battery 5, and the PCU 6 flows toward the main radiator 11 via the coolant return passage 44 and its branching passages 44d and 44e.

In the case where the control temperatures of the intercooler 4, the high-pressure battery 5, and the PCU 6 are almost equal, by connecting the intercooler 4, the high-pressure battery 5, and the PCU 6 to one another in parallel by way of the coolant feed passage 43 and the coolant return passage 44 as described above, it is possible to allow coolant to pass through the low-temperature devices 4 to 6 at a uniform temperature and cool them to their control temperatures.

Meanwhile, in a cooling system 71 according to a third modified example illustrated in FIG. 6A, the intercooler 4, the high-pressure battery 5, and the PCU 6 are connected to one another in parallel, and this cooling system differs from that of the above second modified example using the single electric pump 23A only in that it uses the electric pumps 23A, 23B, and 23C respectively for the intercooler 4, the high-pressure battery 5, and the PCU 6. Note that, as illustrated in FIG. 6B, the cooling system 71 of the third modified example can be provided with the regulating valve-equipped bypass passage 12b instead of the bypass passage 12a and the thermostat 14 in FIG. 6A like the cooling system 41 of FIG. 3B described above.

In the cooling system 71, in response to actuation of at least one of the three electric pumps 23A, 23B, and 23C, apart of coolant having released heat to the main radiator 11 flows to the low-temperature device(s) 4, 5, and/or 6 corresponding to the actuated electric pump(s) 23A, 23B, and/or 23C via the coolant feed passage 43. Then, the coolant having passed through the low-temperature device(s) 4, 5, and/or 6 flows toward the main radiator 11 via the coolant return passage 44.

According to the cooling system 71 described above, in not only the case where the control temperatures of the intercooler 4, the high-pressure battery 5, and the PCU 6 are almost equal but also the case where these control temperatures differ from one another, it is possible to cool the low-temperature devices 4 to 6 to their control temperatures by adjusting the amount of coolant to be pumped by each of the electric pumps 23A, 23B, and 23C.

Note that the present invention is not limited to the embodiments described above, and may be embodied in various modes. For example, in both the first and second embodiments, the description has been given of the case where the cooling systems 1 and 41 according to the embodiments of the present invention are employed in the hybrid vehicle; however, the present invention is not limited thereto, and may be employed in an electric vehicle and a fuel cell vehicle, not to mention a vehicle having only the engine 3 as its power source.

In addition, although the embodiments illustrate the engine body 3 as an example of the high-temperature device according to an embodiment of the present invention and the intercooler 4, the high-pressure battery 5, and the PCU 6 as an example of the low-temperature device, the high-temperature device and the low-temperature device according to an embodiment of the present invention are not limited thereto. Instead, one of in-vehicle devices that needs cooling and has the highest control temperature may be employed as the high-temperature device, and various devices other than the high-temperature device that need cooling may be employed as the low-temperature device. Here, in the case where the embodiment of the present invention is employed in an electric vehicle, a drive motor which is a power source of the vehicle may be employed as the high-temperature device according to the embodiment of the present invention; in the case where the embodiment of the present invention is employed in a fuel cell vehicle, a fuel cell stack may be employed as the high-temperature device according to the embodiment of the present invention.

Further, although one of the set of the bypass passage 12a and the thermostat 14 and the bypass passage 12b equipped with the regulating valve 42 is installed in each of the cooling systems 41, 51, 61, and 71 of the second embodiment and its first to third modified examples, it is also possible to install both of them in the cooling systems 41, 51, 61, and 71.

Furthermore, the detailed configurations and the like of the cooling systems 1, 41, 51, 61, and 71 in the embodiments are merely shown for illustrative purposes, and may be changed as appropriate within the gist of the present invention.

In order to achieve the above objective, an embodiment of the present invention according to claim 1 provides a cooling system 1 for a vehicle designed to cool multiple devices that need cooling so as to control the devices at respective predetermined temperatures, the system being characterized by including: a high-temperature cooling circuit 10 having a high-temperature device (an engine body 3a in this embodiment (the same applies below in this paragraph)) being a device whose temperature at which the device should be controlled is the highest among the multiple devices, a high-temperature radiator (a main radiator 11), a high-temperature coolant passage (a coolant passage 12) being connected to the high-temperature device and the high-temperature radiator for circulating coolant therebetween, and a high-temperature pump (a coolant pump 13) being designed to pump out coolant to the high-temperature coolant passage and circulate the coolant therethrough; a low-temperature cooling circuit 20 having multiple low-temperature devices (an intercooler 4, a high-pressure battery 5, and a PCU 6) being the multiple devices other than the high-temperature device, a low-temperature radiator (a sub-radiator 21), a low-temperature coolant passage (a coolant passage 22) being connected to each of the multiple low-temperature devices and the low-temperature radiator for circulating coolant therebetween, and multiple low-temperature pumps (electric pumps or second pumps 23A, 23B, and 23C) being provided for the respective multiple low-temperature devices and designed to pump out coolant to the low-temperature coolant passage and circulate the coolant therethrough; and a coolant introduction passage 31 being connected to the high-temperature cooling circuit and the low-temperature cooling circuit for introducing coolant in the high-temperature cooling circuit to a position between each of the multiple low-temperature devices and the low-temperature radiator in the low-temperature cooling circuit and upstream of the corresponding one of the multiple low-temperature devices.

According to this configuration, in the vehicle equipped with the multiple devices that need cooling, the cooling system designed to cool these devices so as to control them at their respective predetermined temperatures includes the high-temperature cooling circuit and the low-temperature cooling circuit described above. In the high-temperature cooling circuit, coolant having been pumped by the high-temperature pump cools the high-temperature device by drawing heat therefrom while circulating by way of the high-temperature coolant passage, and releases the heat thus drawn to the high-temperature radiator. Because the temperature of the high-temperature device is high through its combustion and generation of heat, the coolant flowing through the high-temperature device has a relatively high temperature (such coolant is hereinafter referred to as the "high-temperature coolant"). On the other hand, in the low-temperature cooling circuit, coolant having been pumped by each of the multiple low-temperature pumps provided for the respective low-temperature devices circulates by way of the low-temperature coolant passage, and cools the corresponding one of the low-temperature devices by drawing heat from the device when passing therethrough and releases the heat thus drawn to the low-temperature radiator. Since the temperature of each low-temperature device at which the device should be controlled (such temperature is hereinafter referred as the "control temperature") is lower than that of the high-temperature device, coolant flowing through the low-temperature cooling circuit has a relatively low temperature (such coolant is hereinafter referred to as the "low-temperature coolant").

In addition, by way of the coolant introduction passage connected to the high-temperature cooling circuit and the low-temperature cooling circuit, high-temperature coolant is introduced between the set of the multiple low-temperature devices and the low-temperature radiator and to the upstream sides of the multiple low-temperature devices and is mixed with low-temperature coolant. In this case, by introducing high-temperature coolant to the upstream sides of the multiple low-temperature devices according to their control temperatures and low-temperature coolant temperatures, the heat of the high-temperature coolant transitions to low-temperature coolant located upstream of the low-temperature devices, thus making it possible to increase their low-temperature coolant temperatures to different temperatures. Thereby, the multiple low-temperature devices can be cooled to their appropriate temperatures by low-temperature coolant so as to be kept at their control temperatures without being cooled too much.

Further, since the cooling system according to the embodiment of the present invention uses the single low-temperature radiator to release heat from low-temperature coolant for the multiple low-temperature devices, it is possible to reduce the number of radiators mounted in the vehicle as compared with a cooling system having a radiator for each device.

An embodiment of the present invention according to claim 2 is characterized in that, in the cooling system for a vehicle described in claim 1, an end part of the coolant introduction passage on the side of the high-temperature cooling circuit is connected to a position in the high-temperature coolant passage downstream of the high-temperature device and upstream of the high-temperature radiator.

According to this configuration, high-temperature coolant to be introduced from the high-temperature cooling circuit to the low-temperature cooling circuit via the coolant introduction passage is a coolant flowing through a position downstream of the high-temperature device and upstream of the high-temperature radiator in the high-temperature coolant passage. In other words, this high-temperature coolant is coolant having cooled the high-temperature device and increased in temperature when passing through this high-temperature device and having finished its role of cooling the high-temperature device. Accordingly, since such high-temperature coolant is introduced into the low-temperature cooling circuit and mixed with low-temperature coolant, it is possible to adjust the temperature of low-temperature coolant without impairing the work of cooling the high-temperature device in the high-temperature cooling circuit.

An embodiment of the present invention according to claim 3 is characterized in that, in the cooling system for a vehicle described in claim 1 or 2, the system further includes multiple regulating valves 33A, 33B, and 33C being provided to correspond respectively to the multiple low-temperature devices in the coolant introduction passage and designed to adjust a flow rate of coolant in the high-temperature cooling circuit to be introduced to the low-temperature cooling circuit.

According to this configuration, since the multiple regulating valves designed to adjust the flow rate of high-temperature coolant to be introduced to the low-temperature cooling circuit are provided in the coolant introduction passage so as to correspond respectively to the multiple low-temperature devices, each regulating valve can adjust the amount of high-temperature coolant to be mixed with low-temperature coolant passing through the corresponding low-temperature device. Thus, by passing low-temperature coolant through each low-temperature device after adjusting its temperature to a temperature suitable for cooling the low-temperature device, it is possible to cool the multiple low-temperature devices appropriately.

An embodiment of the present invention according to claim 4 is characterized in that, in the cooling system for a vehicle described in claim 3, each of the multiple regulating valves is designed so that an opening thereof is regulatable, and the system further includes: a target temperature setting unit (an ECU 2) being configured to set target temperatures of the respective multiple low-temperature devices; a high-temperature coolant temperature detecting unit (an engine water temperature sensor 15 or a first coolant temperature sensor 15) being configured to detect, as a high-temperature coolant temperature (an engine water temperature TWE), a temperature of coolant having exchanged heat with the high-temperature device; a first low-temperature coolant temperature detecting unit (a sub-radiator water temperature sensor 24 or a second coolant temperature sensor 24) being configured to detect, as a first low-temperature coolant temperature (a sub-radiator water temperature TWSR), a temperature of coolant having released heat to the low-temperature radiator; a second low-temperature coolant temperature detecting unit (or a third coolant temperature sensor including an intercooler water temperature sensor 25, a high-pressure battery water temperature sensor 26, and a PCU water temperature sensor 27) being configured to detect, as a second low-temperature coolant temperature (an intercooler water temperature TWIC, a high-pressure battery water temperature TWBT, and a PCU water temperature TWPC), a temperature of coolant to exchange heat with each of the multiple low-temperature devices; a low-temperature coolant pump-out amount setting unit (an ECU 2) being configured to set, as a low-temperature coolant pump-out amount (a pump flow rate QEWP), an amount of coolant to be pumped by each of the multiple low-temperature pumps according to a corresponding one of the multiple low-temperature devices; a high-temperature coolant introduction amount calculating unit (an ECU 2) being configured to calculate, for each of the multiple low-temperature devices, an amount of coolant in the high-temperature cooling circuit to be introduced to the low-temperature cooling circuit (a valve flow rate QVLV), based on the high-temperature coolant temperature and first low-temperature coolant temperature thus detected and the low-temperature coolant pump-out amounts thus set, so that the second low-temperature coolant temperature for the corresponding one of the multiple low-temperature devices becomes the target temperature set for the corresponding one of the multiple low-temperature devices; and a regulating valve controlling unit (an ECU 2) being configured to control the opening of each of the multiple regulating valves according to the corresponding coolant introduction amount thus calculated.

According to this configuration, the target temperature setting unit sets the target temperatures, as the control temperatures, of the respective multiple low-temperature devices. In addition, the temperature of coolant having exchanged heat with the high-temperature device is detected as the high-temperature coolant temperature, the temperature of coolant having released heat to the low-temperature radiator is detected as the first low-temperature coolant temperature, and the temperature of coolant to exchange heat with each of the multiple low-temperature devices is detected as the second low-temperature coolant temperature, and the amount of coolant to be pumped by each of the multiple low-temperature pumps is set as the low-temperature coolant pump-out amount according to a corresponding one of the multiple low-temperature devices. Then, the flow rate of coolant in the high-temperature cooling circuit to be introduced to the low-temperature cooling circuit (hereinafter referred to as the "high-temperature coolant introduction amount") is calculated for each of the multiple low-temperature devices, based on the high-temperature coolant temperature and first low-temperature coolant temperature thus detected and the low-temperature coolant pump-out amounts thus set, so that the second low-temperature coolant temperature for the corresponding one of the multiple low-temperature devices becomes the target temperature set for the corresponding one of the multiple low-temperature devices, and the opening of each of the multiple regulating valves is controlled according to the corresponding high-temperature coolant introduction amount thus calculated.

As will be described later, the above high-temperature coolant introduction amount can be calculated appropriately based on the high-temperature coolant temperature, the first low-temperature coolant temperature, and the corresponding low-temperature coolant pump-out amount and target temperature described above. Accordingly, by regulating the opening of each regulating valve according to the corresponding high-temperature coolant introduction amount thus calculated, it is possible to cause low-temperature coolant, adjusted to temperatures suitable for the respective multiple low-temperature devices, to pass through these devices. Thereby, the multiple low-temperature devices can be cooled to their control temperatures appropriately.

An embodiment of the present invention according to claim 5 is characterized in that, in the cooling system for a vehicle described in claim 4, the low-temperature coolant pump-out amount setting unit is configured to set the low-temperature coolant pump-out amount for each of the multiple low-temperature devices according to an amount of heat discharged from the corresponding one of the multiple low-temperature devices, and the system further includes a pump controlling unit (an ECU 2) being configured to control each of the multiple low-temperature pumps so that the pump pumps out the corresponding low-temperature coolant pump-out amount thus set.

According to this configuration, the multiple low-temperature pumps are each controlled by the pump controlling unit so that it pumps out the low-temperature coolant pump-out amount set according to the amount of heat discharged from the corresponding one of the multiple low-temperature devices. For example, by pumping out a larger amount of low-temperature coolant to a low-temperature device with a larger amount of discharged heat, it is possible to prevent the low-temperature devices that generate heat from being heated excessively.

An embodiment of the present invention according to claim 6 provides a cooling system 41, 51, 61, or 71 for a vehicle designed to cool multiple devices that need cooling so as to control the devices at respective predetermined temperatures, the system being characterized by including: a high-temperature cooling circuit 10 having a high-temperature device (an engine body 3a) being a device whose temperature at which the device should be controlled is the highest among the multiple devices, a high-temperature radiator (a main radiator 11), a high-temperature coolant passage (a coolant passage 12) being connected to the high-temperature device and the high-temperature radiator for circulating coolant therebetween, and a high-temperature pump (a coolant pump 13) being designed to pump out coolant to the high-temperature coolant passage and circulate the coolant therethrough; at least one low-temperature device (an intercooler 4, a high-pressure battery 5, and/or a PCU 6) being the multiple devices other than the high-temperature device; a low-temperature coolant passage (a coolant feed passage 43 and a coolant return passage 44) being connected to the low-temperature device and the high-temperature coolant passage for circulating coolant between the low-temperature device and the high-temperature radiator; a low-temperature pump ((an) electric pump(s) 23A, 23B, and/or 23C) being installed in the low-temperature coolant passage and designed to circulate coolant between the low-temperature device and the high-temperature radiator; and a high-temperature radiator bypass passage (a bypass passage 12a, a regulating valve-equipped bypass passage 12b) being installed in the high-temperature coolant passage for introducing coolant having exchanged heat with the high-temperature device to a position upstream of the high-temperature device while bypassing the high-temperature radiator.

According to this configuration, in the vehicle equipped with the multiple devices that need cooling, the cooling system designed to cool these devices so as to control them at their respective predetermined temperatures includes the high-temperature cooling circuit described above. In the high-temperature cooling circuit, as in claim 1 described previously, coolant having been pumped by the high-temperature pump cools the high-temperature device by drawing heat therefrom while circulating by way of the high-temperature coolant passage, and releases the heat thus drawn to the high-temperature radiator. In addition, the at least one low-temperature device being the multiple devices other than the high-temperature device is connected to the high-temperature coolant passage via the low-temperature coolant passage, and coolant circulates through the low-temperature device and the high-temperature radiator with the low-temperature pump installed in the low-temperature coolant passage. In other words, coolant having decreased in temperature by releasing heat to the high-temperature radiator circulates byway of the low-temperature coolant passage, and cools the low-temperature device by drawing heat therefrom. As described above, the high-temperature device and the at least one low-temperature device are cooled using the high-temperature radiator in the high-temperature cooling circuit as a shared radiator.

Besides, the high-temperature radiator bypass passage bypassing the high-temperature radiator is installed in the high-temperature coolant passage. In the case where the high-temperature radiator is set to have a cooling performance suitable for cooling the low-temperature device whose control temperature is lower than that of the high-temperature device, the high-temperature device might be cooled too much if low-temperature coolant having released heat to the high-temperature radiator directly passes through the high-temperature device. For this reason, coolant having passed through the high-temperature radiator bypass passage, i.e. high-temperature coolant not having released heat to the high-temperature radiator is introduced to the upstream side of the high-temperature device and passed through the high-temperature device together with the low-temperature coolant described above. Thereby, the high-temperature device can be cooled appropriately without being cooled too much. As described above, it is possible to cool the low-temperature device as well as the high-temperature device using the high-temperature radiator being the single radiator while reliably adjusting the temperature of the high-temperature device appropriately, and thus to cool the high-temperature device and the at least one low-temperature device to the respective different control temperatures.

An embodiment of the present invention according to claim 7 is characterized in that, in the cooling system for a vehicle described in claim 6, the system further includes a regulating valve (a thermostat 14, a regulating valve 42) being installed in the high-temperature radiator bypass passage and designed to adjust a flow rate of coolant to be introduced to the upstream side of the high-temperature device via the high-temperature radiator bypass passage.

According to this configuration, the regulating valve installed in the high-temperature radiator bypass passage can adjust the flow rate of high-temperature coolant introduced to the upstream side of the high-temperature device while bypassing the high-temperature radiator. Thus, by passing coolant through the high-temperature device after adjusting its temperature to a temperature suitable for cooling the high-temperature device, it is possible to cool the high-temperature device appropriately without cooling it too much.

An embodiment of the present invention according to claim 8 is characterized in that, in the cooling system for a vehicle described in claim 7, the low-temperature coolant passage is connected to the high-temperature coolant passage at a position (a position R) downstream of the high-temperature radiator and closer to the high-temperature radiator than a point of connection with a downstream end of the high-temperature radiator bypass passage, and is designed so that coolant having released heat to the high-temperature radiator passes through the low-temperature device.

According to this configuration, the low-temperature coolant passage is connected to the high-temperature coolant passage at the position downstream of the high-temperature radiator and closer to the high-temperature radiator than the point of connection with the downstream end of the high-temperature radiator bypass passage. This makes it possible to cause coolant with the lowest temperature just having released heat to the high-temperature radiator to pass through the low-temperature device by way of the low-temperature coolant passage, and thus to cool the low-temperature device with the low control temperature effectively.

An embodiment of the present invention according to claim 9 is characterized in that, in the cooling system for a vehicle described in claim 8, the low-temperature device is constituted of multiple low-temperature devices, and the multiple low-temperature devices are connected to each other in series or in parallel via the low-temperature coolant passage.

According to this configuration, the multiple low-temperature devices are connected to each other in series or in parallel via the low-temperature coolant passage. In the case where the multiple low-temperature devices have different control temperatures, for example, these low-temperature devices are connected to each other in series so that coolant passing through the low-temperature coolant passage may pass through the low-temperature devices in the order of control temperature from low to high. Thus, by drawing heat from the multiple low-temperature devices when passing therethrough, coolant can cool the low-temperature devices to different temperatures while gradually increasing in temperature as it cools these low-temperature devices. Meanwhile, in the case where the control temperatures of the multiple low-temperature devices are almost equal, for example, these low-temperature devices are connected to each other in parallel. Thereby, it is possible to allow coolant to pass through the low-temperature devices by way of the low-temperature coolant passage at a uniform temperature, and thus to cool these low-temperature devices to almost the same temperature. Note that, even in the case where the multiple low-temperature devices are connected to each other in parallel, it is also possible to cool the multiple low-temperature devices to different control temperatures by arranging a pump, whose coolant flow rate is regulatable, for each of these low-temperature devices.

Obviously, numerous modifications and variations of the present invention are possible in light of the above teachings. It is therefore to be understood that within the scope of the appended claims, the invention may be practiced otherwise than as specifically described herein.

What is claimed is:

1. A cooling system for a vehicle designed to cool a plurality of devices that need cooling so as to control said devices at respective predetermined temperatures, said system comprising:
   a high-temperature cooling circuit having
      a high-temperature device being a device whose temperature at which said device should be controlled is the highest among said plurality of devices,
      a high-temperature radiator,
      a high-temperature coolant passage being connected to said high-temperature device and said high-temperature radiator for circulating coolant therebetween, and
      a high-temperature pump being designed to pump out coolant to said high-temperature coolant passage and circulate said coolant therethrough;
   a low-temperature cooling circuit having
      a plurality of low-temperature devices being said plurality of devices other than said high-temperature device,
      a low-temperature radiator,
      a low-temperature coolant passage being connected to each of said plurality of low-temperature devices and said low-temperature radiator for circulating coolant therebetween, and
      a plurality of low-temperature pumps being provided for said respective plurality of low-temperature devices and designed to pump out coolant to said low-temperature coolant passage and circulate said coolant therethrough;
   a coolant introduction passage being connected to said high-temperature cooling circuit and said low-temperature cooling circuit for introducing coolant in said high-temperature cooling circuit to a position between each of said plurality of low-temperature devices and said low-temperature radiator in said low-temperature cooling circuit and upstream of said corresponding one of said plurality of low-temperature devices; and
   a high-temperature radiator bypass passage being installed in said high-temperature coolant passage for introducing coolant having exchanged heat with said high-temperature device to a position upstream of said high-temperature device while bypassing said high-temperature radiator, wherein said low-temperature coolant passage is connected to said high-temperature coolant passage at a position downstream of said high-temperature radiator and closer to said high-temperature radiator than a point of connection with a downstream end of said high-temperature radiator bypass passage, and is designed so that coolant having released heat to said high-temperature radiator passes through said low-temperature device.

2. The cooling system for a vehicle according to claim 1, wherein an end part of said coolant introduction passage on the side of said high-temperature cooling circuit is connected to a position in said high-temperature coolant passage downstream of said high-temperature device and upstream of said high-temperature radiator.

3. The cooling system for a vehicle according to claim 1, further comprising a plurality of regulating valves being provided to correspond respectively to said plurality of low-temperature devices in said coolant introduction passage and designed to adjust a flow rate of coolant in said high-temperature cooling circuit to be introduced to said low-temperature cooling circuit.

4. The cooling system for a vehicle according to claim 3, wherein
each of said plurality of regulating valves is designed so that an opening thereof is regulatable, and
said system further comprises:
a target temperature setting unit being configured to set target temperatures of said respective plurality of low-temperature devices;
a high-temperature coolant temperature detecting unit being configured to detect, as a high-temperature coolant temperature, a temperature of coolant having exchanged heat with said high-temperature device;
a first low-temperature coolant temperature detecting unit being configured to detect, as a first low-temperature coolant temperature, a temperature of coolant having released heat to said low-temperature radiator;
a second low-temperature coolant temperature detecting unit being configured to detect, as a second low-temperature coolant temperature, a temperature of coolant to exchange heat with each of said plurality of low-temperature devices;
a low-temperature coolant pump-out amount setting unit being configured to set, as a low-temperature coolant pump-out amount, an amount of coolant to be pumped by each of said plurality of low-temperature pumps according to a corresponding one of said plurality of low-temperature devices;
a high-temperature coolant introduction amount calculating unit being configured to calculate, for each of said plurality of low-temperature devices, an amount of coolant in said high-temperature cooling circuit to be introduced to said low-temperature cooling circuit, based on said high-temperature coolant temperature and first low-temperature coolant temperature thus detected and said low-temperature coolant pump-out amounts thus set, so that said second low-temperature coolant temperature for said corresponding one of said plurality of low-temperature devices becomes said target temperature set for said corresponding one of said plurality of low-temperature devices; and
a regulating valve controlling unit being configured to control the opening of each of said plurality of regulating valves according to said corresponding coolant introduction amount thus calculated.

5. The cooling system for a vehicle according to claim 4, wherein
said low-temperature coolant pump-out amount setting unit is configured to set said low-temperature coolant pump-out amount for each of said plurality of low-temperature devices according to an amount of heat discharged from said corresponding one of said plurality of low-temperature devices, and
said system further comprises a pump controlling unit being configured to control each of said plurality of low-temperature pumps so that said pump pumps out said corresponding low-temperature coolant pump-out amount thus set.

6. A cooling system for a vehicle designed to cool a plurality of devices that need cooling so as to control said devices at respective predetermined temperatures, said system comprising:
a high-temperature cooling circuit having
a high-temperature device being a device whose temperature at which said device should be controlled is the highest among said plurality of devices,
a high-temperature radiator,
a high-temperature coolant passage being connected to said high-temperature device and said high-temperature radiator for circulating coolant therebetween, and
a high-temperature pump being designed to pump out coolant to said high-temperature coolant passage and circulate said coolant therethrough;
at least one low-temperature device being said plurality of devices other than said high-temperature device;
a low-temperature coolant passage being connected to said low-temperature device and said high-temperature coolant passage for circulating coolant between said low-temperature device and said high-temperature radiator;
a low-temperature pump being installed in said low-temperature coolant passage and designed to circulate coolant between said low-temperature device and said high-temperature radiator; and
a high-temperature radiator bypass passage being installed in said high-temperature coolant passage for introducing coolant having exchanged heat with said high-temperature device to a position upstream of said high-temperature device while bypassing said high-temperature radiator,
wherein said low-temperature coolant passage is connected to said high-temperature coolant passage at a position downstream of said high-temperature radiator and closer to said high-temperature radiator than a point of connection with a downstream end of said high-temperature radiator bypass passage, and is designed so that coolant having released heat to said high-temperature radiator passes through said low-temperature device.

7. The cooling system for a vehicle according to claim 6, further comprising a regulating valve being installed in said high-temperature radiator bypass passage and designed to adjust a flow rate of coolant to be introduced to the upstream side of said high-temperature device via said high-temperature radiator bypass passage.

8. The cooling system for a vehicle according to claim 6, wherein
said low-temperature device is constituted of a plurality of low-temperature devices, and said plurality of low-temperature devices are connected to each other in series or in parallel via said low-temperature coolant passage.

9. A cooling system for a vehicle, comprising:
a first cooling circuit comprising:
 a first device;
 a first radiator;
 a first coolant passage connecting the first device and the first radiator; and
 a first pump provided in the first coolant passage to circulate coolant in the first cooling circuit so as to cool the first device to a first temperature;
a second cooling circuit comprising:
 a second device;
 a second radiator;
 a second coolant passage connecting the second device and the second radiator; and
 a second pump provided in the second coolant passage to circulate coolant in the second cooling circuit so as to cool the second device to a second temperature, the second temperature being lower than the first temperature;
a coolant introduction passage connecting the first cooling circuit and a connected portion of the second cooling circuit between the second device and the second radiator and upstream of the second device to supply the coolant in the first cooling circuit to the second cooling circuit; and
a bypass passage provided in the first coolant passage and bypassing the first radiator such that the coolant having exchanged heat with the first device is introduced to a position at an upstream of the first device in the first coolant passage,
wherein the second coolant passage is connected to a first connection position of the first coolant passage which is downstream of the first radiator between the first radiator and a second connection position of a downstream end of the bypass passage such that the coolant having released heat to the first radiator passes through the second device.

10. The cooling system for a vehicle according to claim 9, wherein an end part of the coolant introduction passage on the side of the first cooling circuit is connected to a position in the first coolant passage downstream of the first device and upstream of the first radiator.

11. The cooling system for a vehicle according to claim 9, further comprising a regulating valve connected to the second device in the coolant introduction passage so as to adjust a flow rate of the coolant in the first cooling circuit to be introduced to the second cooling circuit.

12. A cooling system for a vehicle comprising:
a first cooling circuit comprising:
 a first device;
 a first radiator;
 a first coolant passage connecting the first device and the first radiator; and
 a first pump provided in the first coolant passage to circulate coolant in the first cooling circuit so as to cool the first device to a first temperature;
a second cooling circuit comprising:
 a second device;
 a second radiator;
 a second coolant passage connecting the second device and the second radiator; and
 a second pump provided in the second coolant passage to circulate coolant in the second cooling circuit so as to cool the second device to a second temperature, the second temperature being lower than the first temperature;
a coolant introduction passage connecting the first cooling circuit and a connected portion of the second cooling circuit between the second device and the second radiator and upstream of the second device to supply the coolant in the first cooling circuit to the second cooling circuit; and
a regulating valve connected to the second device in the coolant introduction passage so as to adjust a flow rate of the coolant in the first cooling circuit to be introduced to the second cooling circuit,
wherein an opening of the regulating valve is regulatable, and
wherein the cooling system further comprises:
 a target temperature setting device to set the second temperature;
 a first coolant temperature sensor to detect a first coolant temperature of the coolant having exchanged heat with the first device;
 a second coolant temperature sensor to detect a second coolant temperature of the coolant having released heat to the second radiator;
 a third coolant temperature sensor to detect a third coolant temperature of the coolant to exchange heat with the second device;
 a second pump coolant supply amount setting device to set a second pump supply amount of the coolant to be supplied to the second device by the second pump;
 a coolant introduction amount calculator to calculate an introduction amount of the coolant in the first cooling circuit to be introduced to the second cooling circuit, based on the first coolant temperature, the second coolant temperature, and the second pump coolant supply amount, so that the third coolant temperature becomes the second temperature; and
 a regulating valve controller to control the opening of the regulating valve according to the introduction amount of the coolant.

13. The cooling system for a vehicle according to claim 12, wherein the second pump coolant supply amount setting device is to set the second pump supply amount of the coolant according to an amount of heat discharged from the second device, and
wherein the cooling system further comprises a pump controller to control the second pump to pump out the second pump supply amount of the coolant.

14. A cooling system for a vehicle, comprising:
a first cooling circuit comprising:
 a first device;
 a first radiator;
 a first coolant passage connecting the first device and the first radiator; and
 a first pump provided in the first coolant passage to circulate the coolant in the first coolant passage so as to cool the first device to a first temperature;
at least one second device;
a third coolant passage connecting the at least one second device and the first coolant passage;
a third pump provided in the third coolant passage to circulate the coolant between the at least one second device and the first radiator in the third coolant passage so as to cool the at least one second device to a second temperature, the second temperature being lower than the first temperature; and a bypass passage provided in the first coolant passage and bypassing the first radiator such that the coolant having exchanged heat with the first device is introduced to a position at an upstream of the first device in the first coolant passage, wherein the third coolant passage is connected to a first connection position of the first coolant passage which is downstream of the first radiator between the first radiator and a second connection position of a downstream end of the bypass passage such that the coolant having released heat to the first radiator passes through the at least one second device.

15. The cooling system for a vehicle according to claim 14, further comprising a regulating valve provided in the bypass passage to adjust a flow rate of the coolant to be introduced to the upstream of the first device via the bypass passage.

16. The cooling system for a vehicle according to claim 14, wherein the cooling system further comprises at least one additional second device, and wherein the second device and the at least one additional second device are connected to each other in series or in parallel via the third coolant passage.

* * * * *